(12) United States Patent
Amos

(10) Patent No.: US 6,449,573 B1
(45) Date of Patent: Sep. 10, 2002

(54) APPARATUS TO CALCULATE DYNAMIC VALUES FOR PRESSURE DENSITY IN AN AIRCRAFT

(76) Inventor: Ian Amos, 15651 McLaughlin Road, Ingle Ontario (CA), L0N 1K0

( * ) Notice: Subject to any disclaimer, the term of this patent is extended or adjusted under 35 U.S.C. 154(b) by 0 days.

(21) Appl. No.: 09/296,711

(22) Filed: Apr. 9, 1999

(51) Int. Cl.$^7$ .............................................. G04B 47/06
(52) U.S. Cl. ............................ 702/98; 702/33; 702/99; 702/130; 702/183
(58) Field of Search .............................. 702/33, 50, 55, 702/98, 99, 100, FOR 130, 138, 139, 140, 183, 188, 189, 198, FOR 103, FOR 104, FOR 123, FOR 124, FOR 127, FOR 134, FOR 135, FOR 143, FOR 142, FOR 158, FOR 162, FOR 170–172; 73/384, 181, 179, 178 T; 701/3; 700/10

(56) References Cited

U.S. PATENT DOCUMENTS

| | | | |
|---|---|---|---|
| 3,839,626 A | | 10/1974 | Klem et al. |
| 3,977,250 A | * | 8/1976 | Amlie .......................... 73/386 |
| 4,008,618 A | | 2/1977 | Younkin |
| 4,106,343 A | * | 8/1978 | Cook ........................... 73/387 |
| 4,133,503 A | | 1/1979 | Bliss |
| 4,263,804 A | | 4/1981 | Seemann |
| 4,292,671 A | * | 9/1981 | Evans et al. ................. 364/433 |
| 4,319,487 A | | 3/1982 | Haase et al. |
| 4,490,802 A | * | 12/1984 | Miller ......................... 364/567 |
| 4,530,060 A | * | 7/1985 | Greene ....................... 364/428 |
| 4,843,554 A | * | 6/1989 | Middleton et al. .......... 364/427 |
| 4,870,412 A | * | 9/1989 | Vuichard ..................... 340/946 |
| 4,951,047 A | * | 8/1990 | Paterson et al. ............. 340/970 |
| 4,980,833 A | | 12/1990 | Milligan et al. |
| 5,001,638 A | | 3/1991 | Simmerman et al. |
| 5,047,942 A | | 9/1991 | Middleton et al. |
| 5,103,224 A | * | 4/1992 | Arad ........................... 340/959 |
| 5,138,559 A | | 8/1992 | Kuehl et al. ................. 73/49.2 T |
| 5,198,980 A | * | 3/1993 | Patrick ........................ 364/424.03 |

(List continued on next page.)

FOREIGN PATENT DOCUMENTS

WO     WO 93/24818     12/1993

OTHER PUBLICATIONS

Internet Article entitled Flying The "Pressure Hills", downloaded from http:www.cyberskies.com/apr1998/inbound.html.

Primary Examiner—Marc S. Hoff
Assistant Examiner—Carol S Tsai
(74) Attorney, Agent, or Firm—Marks & Clerk (57) ABSTRACT

An apparatus for use in an aircraft for determining and displaying a reading which is indicative of pressure density at any instant in time, comprises sensing means for determining both ambient air pressure and ambient air temperature at any instant in time, and outputting an electrical signal having a value which varies in accordance therewith. Calculating means are provided for combining those electrical signals and outputting a weighted signal for pressure density having a value based on an index value of zero for a pressure density at sea level when the ambient temperature is 59° F. and the ambient pressure is 29.92 inches of mercury. A microprocessor computer means has random access memory and read only memory, and an output signal driver for outputting a signal indicative of pressure density at any instant in time to a display. The microprocessor includes a lookup and comparator means, and the read only memory contains a plurality of calculated values of pressure density over a range of barometric pressure values. The weighted signal from the calculating means is read by the lookup and comparator means, and compared with values of pressure density stored in the read only memory, so as to determine the value of pressure density at that instant in time, and to display that value. The apparatus will also provide a real time indication of chosen aircraft flying characteristics, depending on the parameters selected, from further lookup tables included in the read only memory.

14 Claims, 1 Drawing Sheet

U.S. PATENT DOCUMENTS

| | | | |
|---|---|---|---|
| 5,207,099 A | | 5/1993 | Baker .......................... 73/292 |
| 5,224,059 A | * | 6/1993 | Nitta et al. .................. 364/558 |
| 5,237,853 A | | 8/1993 | Cassaday et al. ........... 73/32 A |
| 5,329,818 A | * | 7/1994 | Frick et al. ................... 73/708 |
| 5,509,295 A | | 4/1996 | Bartoli |
| 5,600,554 A | * | 2/1997 | Williams .................... 395/201 |
| 5,648,604 A | | 7/1997 | Morbieu |
| 5,686,664 A | * | 11/1997 | Pearcy ........................ 73/384 |
| 5,781,126 A | * | 7/1998 | Paterson et al. ............ 340/970 |
| 5,796,612 A | | 8/1998 | Palmer ............... 364/424.013 |
| 5,982,300 A | * | 11/1999 | Greene ....................... 340/959 |
| 6,140,942 A | | 10/2000 | Bragg et al. ................ 340/962 |
| 6,253,126 B1 | | 6/2001 | Palmer ........................ 701/14 |

* cited by examiner

FIG. 1

APPARATUS TO CALCULATE DYNAMIC VALUES FOR PRESSURE DENSITY IN AN AIRCRAFT

FIELD OF THE INVENTION

This invention relates to apparatus for use in an aircraft, and is particularly adapted for and intended to be used in small aircraft. The purpose of the apparatus of the present invention is to provide a device which will, at any instant in time, determine the ambient temperature and barometric pressure of the air where the aircraft is presently located, whether it is flying or on the ground, and to provide a readout of pressure density—otherwise also known as density altitude. The present invention may also provide further displays for specific aircraft performance characteristics, at any instant in time.

BACKGROUND OF THE INVENTION

Any aircraft pilot has, of course, great concern about the performance of the aircraft that he/she is flying. Accordingly, the pilot relies on a great variety of instruments which are mounted in the cockpit of the aircraft within his/her field of view. Of course, in larger multi-engine aircraft, and especially commercial aircraft, as well as in high performance aircraft such as military aircraft, there may be very extensive instrumentation. On the other hand, in small single, two-seater or four-seater, single-engine aircraft of the sort used by recreational flyers, bush pilots, and the like, there may be a paucity of instrumentation—the aircraft being provided with sufficient instrumentation to permit it to be safely flown, as determined by the manufacturer of the aircraft.

However, no aircraft is provided with an instrument which will give a dynamic reading of pressure density, which is sometimes referred to as density altitude. Knowledge of the pressure density at any instant in time is required to determine requirements or flying characteristics such as ground roll necessary for safe takeoff of the aircraft, or for a determination of true air speed over ground. Other performance characteristics are more particularly described and discussed hereafter. However, it must be understood that it is the importance of density altitude, and the manner in which it affects other readings, which is primarily being dealt with.

Of course, it is well understood that the higher the altitude—generally, altitude is determined as being the altitude above sea level—the less dense the air. Likewise, the warmer the air becomes, the less dense it will become. It must also be understood that what is called an altimeter in an aircraft, especially a small aircraft, is not in fact an instrument which measures precise altitude above sea level. In fact, the altimeter is actually an aneroid barometer which measures atmospheric pressure. There is, therefore, an indicated altitude, but that indicated altitude must be corrected for local conditions—a process which is well known to aircraft pilots, particularly as they are preparing for takeoff. Especially, the flight altimeter settings for the aircraft must be adjusted by the pilot to the airport elevation and station pressure, with the current ambient temperature having to be taken into account when the pilot is calculating the length of the ground roll which is required for takeoff.

Moreover, as will be discussed in greater detail hereafter, atmospheric pressure and temperature conditions are dynamic, and are constantly changing. It is well known that atmospheric pressure and temperature will affect flight performance of the aircraft, as well as its takeoff and landing conditions. Thus, the need for dynamic and real time knowledge of the pressure density becomes understood.

There are a number of different readings or indicators of altitude which may be referred to or required to be known at any instant in time by the pilot of an aircraft. Again, it must be understood that an altimeter in an aircraft is calibrated to show height above sea level under standard atmospheric conditions. Standard atmospheric conditions are 29.92 inches of mercury and 59° F. However, local conditions of temperature and pressure will most likely not match the standard conditions.

Indicated altitude is the altitude which is shown on the altimeter of the aircraft. If the altimeter is set to the current atmospheric pressure, corrected to sea level, the indicated altitude will be approximately equal to the height of the aircraft above sea level.

Pressure altitude is the altitude which is shown on the altimeter when the pressure is set to 29.92 inches of mercury.

Density altitude—or pressure density, as it referred to herein—is the pressure altitude which is corrected for deviations from standard temperature. It is important for the pilot to know the pressure density or density altitude in order for him/her to calculate the required runway for ground roll in order to takeoff, and to determine the rate of climb of the aircraft once it has taken off. Particular embodiments of the present invention will provide those data automatically to the pilot, upon an appropriate query and input of necessary parameter data to the apparatus of the present invention.

It will be understood that takeoff on a hot day from an airport with an elevation well above sea level will require much greater ground roll than a takeoff from an airport at sea level on a cold day.

True altitude is the actual height of the aircraft above sea level. If the altimeter in a small aircraft has been set to local pressure, corrected to sea level, than the indicated altitude is approximately the true altitude of the aircraft above sea level.

The other two types of altitude, absolute altitude and radio or radar altitude, require that the aircraft be equipped with a radio or radar altimeter, and are beyond the scope of the present discussion.

The effect of normal pressure variations on true altitude may be quite profound. Pilots are warned to always recall that pressure variations will change from time to time, as they fly across country, as the day warms up or cools down, or as a weather front may be moving into the region where the aircraft is operating. If a pilot is flying the aircraft having a constant indicated altitude, the aircraft is, in fact, being flown in a constant barometric pressure—the aircraft is following an isobaric profile. Thus, if the aircraft is flown at a constant indicated altitude into an area of lower barometric pressure, it is flown "downhill" into a pressure valley; and, if the aircraft is flown into an area of higher of barometric pressure, it climbs a pressure hill.

Pilots of small aircraft that fly into an area of low pressure may notice a pressure drop of as much as 0.5 inches of mercury over a distance of as little as 200 miles in a severe weather front. Since atmospheric pressure above a given land point will decrease by about 0.1 inch of mercury per 100 feet of altitude, the pressure effect can be quite profound—in the example given above, as much as 500 feet. Moreover, as the temperature changes, the density of the air will also change; therefore, flying into a low pressure area on a warm day, with the temperature rising, may indeed have profound affects on the flying characteristics of the aircraft and particularly on a determination of where the aircraft is actually located in altitude.

Examples of the manner in which temperature will affect pressure density or density altitude are now given. As stated, the international standard for zero feel of pressure density or density altitude is 59° F. at sea level and 29.92 inches of mercury. However, at sea level and 29.92 inches of mercury, if the temperature rises to 80° F., the pressure density will rise to 1,200 feet. In other words, the same air density will occur at sea level and 29.92 inches of mercury at 80° F. as will occur had the aircraft taken off from sea level at 59° F. and 29.92 inches of mercury and climbed to 1,200 feet. Likewise, as temperature goes down, pressure density will go down. For example, if the temperature is 52° F. and the barometric pressure is 29.92 inches of mercury at 2,000 feet, the pressure density will also be zero feet—that is, the same conditions prevail as they did at sea level and 59° F. and 29.92 inches of mercury.

Another example is that, at 8,000 feet true altitude above sea level, and 80° F., the pressure density will be 11,100 feet; whereas, as sea level, the pressure density will only be 1,200 feet.

Obviously, therefore, an increase in pressure density or density altitude will require an increased takeoff distance, and result in a reduced rate of climb once the aircraft has taken off. Moreover, the increase in pressure density will result in an increased true air speed on approach and landing—lift reduces as air density reduces—and it will require a longer landing roll distance as well.

The necessity for a device which will give dynamic readings of pressure density, or density altitude, becomes clear. Such a device that will operate in real time so that, at any instant in time, the pilot may determine the existing condition of pressure density, allows for much safer operating conditions of the aircraft, and such an instrument is provided by the present invention.

Thus, when the pilot of an aircraft is able to determine dynamic pressure density readings at any time throughout the flight of the aircraft, the pilot will have an improved overview of the current operating limitations of the aircraft. Thus, the pilot will have a much greater understanding of the true air speed of the aircraft, the ground roll required for takeoff or landing, the service ceiling beyond which the aircraft should not fly, and so on.

Briefly, a pressure density determining apparatus must be able to sense the current ambient temperature and the current ambient barometric pressure, and the device must be able to correlate the two so as to calculate the value of pressure density. The correlation is in the form of a calculated lookup table for a broad range of pressure values, as discussed hereafter. Briefly, however, this will permit the pilot to query the apparatus of the present invention, after the apparatus has sensed the current operating ambient temperature and barometric pressure values so that, expected ground roll at that given pressure density for that aircraft may be determined. If so, then the pilot is aware of the minimum required runway length for takeoff.

As discussed hereafter, the device of the present invention may also be used to calculate true air speed at a given power setting. Once a pressure density value has been calculated, the indicated air speed may be input into the device, and a waiting factor assigned to it, which is determined as a function of the pressure density, so as to determine true air speed.

DESCRIPTION OF THE PRIOR ART

CLEM et al. U.S. Pat. No. 3,839,626 teach an altimeter setting indicator which is intended to specifically provide a means for converting measured airport barometric pressure to altimeter setting barometric pressure. This device is used to provide remote digital readouts for reporting by the airport tower and air traffic control centres, but the device is not used on the aircraft per se. The device uses a barometric pressure sensor to provide a signal to a convertor, which will convert that signal into a corresponding day pressure altitude signal. A computer which is responsive to the local pressure signal as well as a signal proportional to the local elevation will then provide signal which corresponds to the altitude difference between the two. A second convertor then responds to this altitude difference and converts it into a signal which is proportional to the corresponding day barometric pressure and provides the required altimeter settings. The data acquired by the barometric pressure sensor is manipulated by a multitude of converters so as to provide an accurate measure of the required altimeter setting pressure to be used by air traffic control towers and/or air traffic control centres who will then relay that information to the pilot of an aircraft for use by the pilot to set a corrected altimeter reading on the instrument panel of the aircraft.

YOUNKIN U.S. Pat. No. 4,008,618 teaches a flight instrument which has both analog and digital display means using a rotary drum digital indicator. The aircraft instrument has a barometric pressure responsive transducer to generate barometric pressure change signals. The dynamic barometric pressure is converted into rectilinear motion, which is used to drive a mechanical-to-electrical transducer which provides a signal to a servo-amplifier so as to drive the rotary drum digital indicator. Means are provided to correct for atmospheric along a given flight path, with respect to sea level.

U.S. Pat. No. 4,133,503 issued to BLISS teaches a method and apparatus by which a pilot can control the speed of an aircraft on the landing approach, where the speed designated eliminates, as much as possible, a wind shear hazard. A conventional central air data computer is used to compute the true air speed by applying temperature and pressure corrections to the indicated airspeed. A safe, stable speed may then be used during landing approaches, and the pilot will be kept apprised of the conditions through which the aircraft is flying during its landing approach.

SEEMANN U.S. Pat. No. 4,263,804 teaches an apparatus which is intended to directly measure the density altitude of an aircraft. However, here a device is taught which requires an electric motor connected to drive a rotor by which an air current is drawn into the apparatus and is constantly sampled, amplified, and changed in shape, and applied as an input signal to a display device which is calibrated to display density altitude—i.e.: pressure density. In order to calculate the density altitude, an amplifier/shaper monitors changes in operational characteristics of the motor. This produces a continuous monitoring signal, which is applied as an input signal to a display device appropriately calibrated.

U.S. Pat. No. 4,980,833 issued to MILLIGAN et al. teaches a takeoff monitor having a learning feature—a smart monitor that learns the takeoff characteristics of the aircraft over a period of time. The monitor maintains historical data of the takeoff performance of the aircraft. The monitor analyses the performance of the aircraft during its takeoff through a movement signal and using the movement signal concomitantly with the historical data allows the pilots to judge the adequacy of takeoff performance during takeoff. The monitor is equipped with a display, an input panel, function keys, and numerical keys; and the input data which are required for the calculation of an acceleration curve including both temperature and pressure. However, the instrument is incapable of sensing any of the required input parameters, and merely provides a database for past performance whereby current performance can be evaluated.

ZIMMERMAN et al. U.S. Pat. No. 5,001,638 teaches the use of a plurality of first and second sensors so as to determine the flight status of an aircraft. These sensors include static pressure sensors, total temperature sensors, and total pressure sensors. However, the patent is particularly directed to monitoring of an engine control system in an aircraft.

MIDDLETON et al. U.S. Pat. No. 5,047,942 teaches a real time takeoff and landing performance monitoring system which is intended to be responsive to various ambient conditions. Temperature and pressure values may be input from transducers, or manually, using a navigation control display unit. This system continuously monitors takeoff and landing performance by comparing the actual performance of the aircraft with nominal performance. The system will generate values for required takeoff roll, instantaneous speed, and acceleration. The apparatus employs the use of lookup tables; and a head-up or head-down display device is employed.

MORBIEU U.S. Pat. No. 5,648,604 describes a method for determining anemobaroclinometric parameters onboard an aircraft. Static pressure and temperature values are obtained using sensors; and, using the temperature and pressure data, density and altitude pressure may be determined through mathematical modes, and estimates of airspeed vector may also be calculated. Two principal computers are required as a means of data delivery.

SUMMARY OF THE INVENTION

In accordance with one aspect of the present invention, there is provided an apparatus which, in general, is physically quite small and which may be hand-held. The apparatus of the present invention is essentially portable, although it may be configured for installation into one specific aircraft. Otherwise, the present invention provides an apparatus which, because it is portable, may be used by such as "weekend" pilots who may fly recreationally, and who are required to rent an aircraft from their flying club.

A purpose of the present invention is to provide an apparatus whereby the pilot, whether he/she is a student pilot, a general aviation pilot, or perhaps a professional pilot such as a bush pilot, may enjoy a greater understanding of atmospheric conditions in which the aircraft is operating, and therefore will have a greater understanding of what aircraft performance is to be expected for that aircraft under the present operating conditions.

The present invention provides an apparatus for use in an aircraft for determining and displaying a reading on a display, where the reading is indicative of pressure density at any instant in time. The apparatus comprises sensing means for determining ambient air pressure and outputting an electrical signal having a value which varies in accordance with the ambient air pressure at any instant in time, and sensing means for determining ambient air temperature and for outputting an electrical signal having a value which various in accordance with the ambient air temperature at any instant in time. Calculating means are provided for combining the electrical signals from the sensing means for ambient air pressure and ambient temperature, and outputting a weighted signal having a value which is based on an index value of zero for a pressure density at sea level when the temperature is 59° F. and the ambient pressure is 29.92 inches of mercury.

Microprocessor computer means are provided having both random access memory and read only memory, and having an output signal driver means for outputting a signal which is indicative of pressure density at any instant in time. A display means is provided for displaying a value of pressure density at any instant in time, based on the value of the signal received from the output signal driver means.

The microprocessor computer means includes a lookup and comparator means. The read only memory contains a plurality of calculated values of pressure density over a range of barometric pressure values chosen from the limits from 28.5 inches of mercury to 31.5 inches of mercury, and a range of temperature values chosen from the limits of from −40° F. to +130° F.

The weighted signal from the calculating means may be read by the comparator and lookup means, and compared with values of pressure density which are stored in the read only memory, so as to determine the value of pressure density at that instant in time, as represented by the weighted signal.

The determined value of pressure density at that instant in time is fed to the output signal driver means so as to cause the display means to display the determined value of pressure density at that instant in time.

Generally, the calculating means is included in the microprocessor computer means. In other words, the calculating means is generally a mathematical operator programmed into the microprocessor so as to take digital electrical signals having values which are indicative of ambient air pressure and ambient air temperature at any instant in time, and calculating a weighted signal which is indicative of pressure density, where a signal having a value of zero is representative of pressure density at sea level when the ambient temperature is 59° F. and the ambient pressure is 29.92 inches of mercury.

On the other hand, the calculating means may be such as a Wheatstone bridge, which is set up with appropriate resistance values so as to provide an electrical signal from its output terminal which output signal is determined from analog signals indicative of ambient air pressure and ambient air temperature at any instant in time. Of course, in such circumstances, an analog to digital convertor will be required to input a meaningful signal indicative of the instantaneous value of pressure density, for further handling by the microprocessor computer means.

So as to make the apparatus of the present invention useful beyond simply determining an instantaneous reading, in real time, of pressure density, the apparatus of the present invention is provided with input means for inputting a selected parameter at any instant in time to the microprocessor computer means. The selected parameter may be one which is chosen from the group consisting of present standing :altitude, aircraft weight, and indicated airspeed.

The input means may comprise a numeric keyboard which will, itself, include appropriate scrolling or function keys, whereby numeric values of present standing altitude, aircraft weight, and indicated air speed may be entered into the microprocessor computer.

On the other hand, the input means may comprise a selector key and a scroll key. In that case, the read only memory of the microprocessor computer will include at least one parameter value table chosen from the group of parameters consisting of present standing altitude, aircraft weight, and indicated air speed. Thus, the specific relevant values of present standing altitude, aircraft weight, or indicated air speed may be chosen from a lookup table using the selector key and scroll key, as necessary.

The read only memory may also include at least one aircraft performance characteristic lookup table generally chosen from the group of aircraft performance lookup tables consisting of takeoff distance, landing distance, rate of climb, time to climb, fuel to climb, and distance to climb.

Thus, at any instant in time, the present value of pressure density may be determined and fed to the microprocessor, and a selected parameter may be input to the microprocessor. Then, the values of pressure density and the selected parameter may be read by lookup means in the microprocessor so as to determine a specific correlated value from a chosen one of the aircraft performance characteristic lookup tables. That specific correlated value of the chosen one of the aircraft performance characteristics may then be fed to the output signal driver so as to output a signal indicative thereof to the display means. Accordingly, the display means will show a reading of the chosen aircraft performance characteristic for the pressure density conditions at that instant in time.

The aircraft performance characteristic lookup tables are generally specific to a particular aircraft type. However, depending on the size of the read only memory which may be installed in the microprocessor computer, it may be that there are aircraft performance characteristic lookup tables included in the read only memory which are specific to a chosen group of particular aircraft types. As an example, tables for aircraft performance characteristics of takeoff distance, landing distance, rate of climb, time to climb, fuel to climb, and distance to climb, may be provided for a group of aircraft manufactured by Cessna, or by Beechcraft, so that a flying club or small operating aviation company which owns and/or operates a number of different aircraft of the same general type, manufactured by the same manufacturer, or more especially a pilot which may fly any one of those different aircraft, may employ the use of a single pressure density determination apparatus in keeping with the present invention, for use with differing aircraft.

Typically, although the following discussion is by way of example only, calculated values of pressure density over a range of barometric pressure values and a range of temperature values will be provided over ranges which may be as broad as from 28.5 inches of mercury to 31.5 inches of mercury for barometric pressure, and from −40° F. to +130° F. for air temperature. Moreover, the steps within each of the ranges may vary, but typically steps of 0.2 inches of mercury and ±5° F. will be sufficient for purposes of providing a meaningful reading of pressure density to the pilot. Indeed, steps as high as 0.3 or 0.4 inches of mercury, and ±10° F. may be acceptable.

BRIEF DESCRIPTION OF THE DRAWING

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

Figure 1:
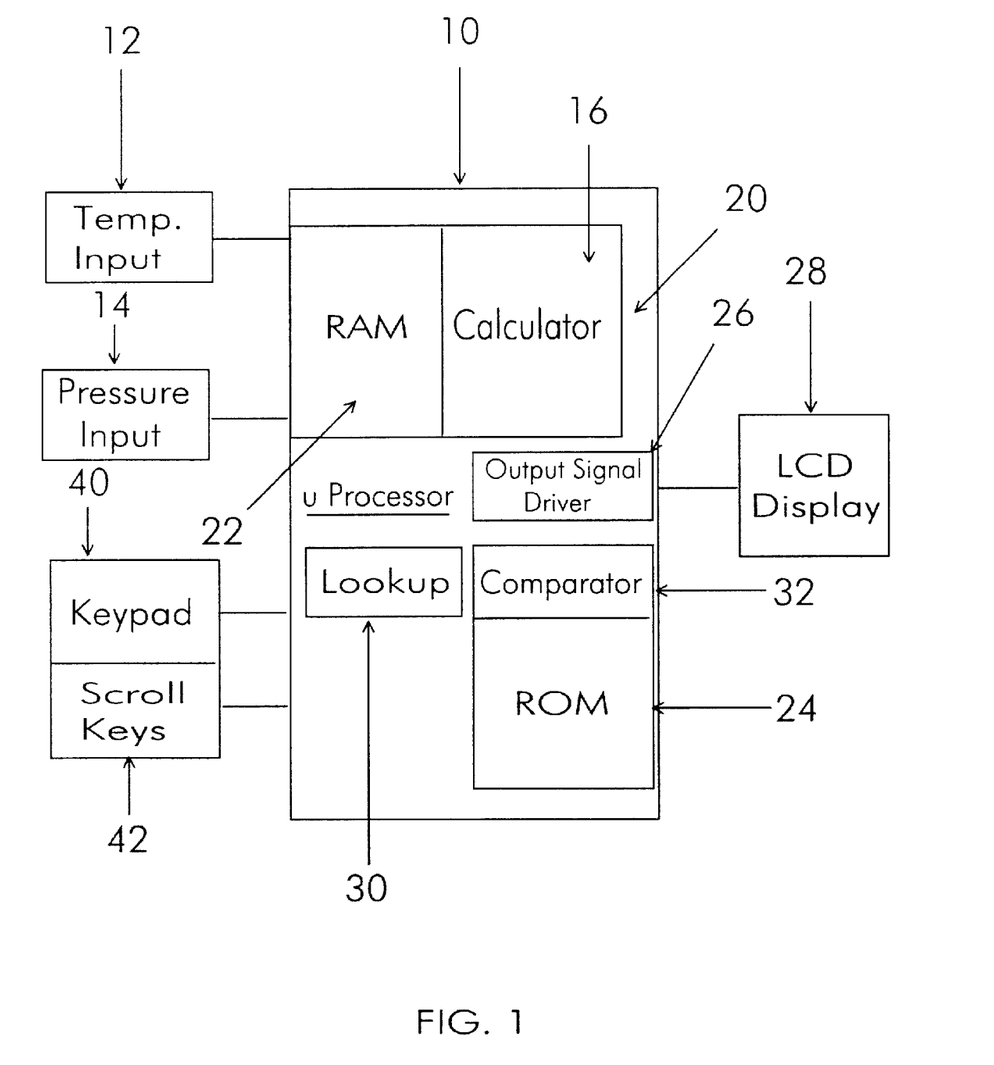
FIG. 1, being the only Figure of drawing, provides a block diagram layout of the principal operating components of an apparatus in keeping with the present invention.

It will be understood that an apparatus in keeping with the present invention may be battery powered, or it may be powered by being connected to an appropriate source of power on board the aircraft. The display on which various readings will be shown will generally be an LCD display, and is shown as such, but other types of displays may be used. Particularly if the display is an LCD display, it may require a separate power source for its back-light; and, of course, appropriate amplifiers, digital to analog converters if necessary, battery sensors, and so on, will be employed. All of those matters are well known to any person skilled in the art of assembling such an apparatus, or installing such an apparatus into the aircraft, and as such they are beyond the scope of the present invention, and are not referenced in the single Figure of drawings.

The apparatus 10 comprises sensing means 12 for determining ambient air temperature, and sensing means 14 for determining ambient air pressure. In each instance, the sensing means 12 or 14 will output an electrical signal having a value which varies in accordance with the ambient air temperature or air pressure at any instant in time. That electrical signal may be a digital signal, or it may be an analog signal.

Calculating means 16 are provided for combining the electrical signals from the sensing means 12 and 14 and so as to output a weighted signal for pressure density, having a value which is based on an index value of zero for a pressure density at sea level when the ambient temperature is 59° F. and the ambient pressure is 29.92 inches of mercury. As noted above, the calculating means 16 may generally be provided in the microprocessor 20; but the calculator means may be located outside the microprocessor 20 when the signals from the temperature and pressure sensors 12, 14 are analog signals. In that case, the calculating means 16 is typically a Wheatstone bridge (not shown).

The microprocessor computer means 20 is provided having both random access memory (RAM) 22 and read only memory (ROM) 24. There is also provided an output signal driver means 26 which will output a signal which is indicative of the pressure density, which signal is received from the calculating means 16, at any instant in time. The signal from the output signal driver means 26 is fed to a display means 28—typically, an LCD display, although other types of displays may be employed. The display 28 will display a value of pressure density—or other values, as discussed hereafter—at any instant in time, based on the value of the signal which is received from the output signal driver means 26, and from the calculator means 16—which signal, as noted, is a weighted signal for pressure density based on ICO standards of sea level, 59° F., and 29.92 inches of mercury.

In order for the signal delivery from the output signal driver 26 to the display 28 to be meaningful, and in order for it to be expressed in terms of feet—the unit by which pressure density or density altitude is expressed—it is necessary for the microprocessor computer 20 to include a lookup and comparator means 30, 32, and for the read only memory 24 to contain a plurality of calculated values of pressure density. Typically, the calculated values of pressure density are over a range of barometric pressure values chosen from the limits of 28.5 inches of mercury to 31.5 inches of mercury, and over a range of temperature values chosen from the limits of −40° F. to +130° F. Thus, the weighted signal from the calculating means 16 may be read by the lookup and comparator means 30, 32, and compared with values of pressure density stored in the read only memory 24, so as to determine the value of pressure density at that instant in time as represented by the weighted signal from the calculator 16.

Of course, it will be understood that the lookup table of values for pressure density will be calculated for steps of pressure gradient and for steps of temperature gradient, and that the comparator means 32 will be instructed by the microprocessor computer 20 to find the closest value for pressure density based on the weighted signal from the calculating means 16. This may provide readings of pressure density in intervals of 10 feet, 20 feet, or 50 feet, but that tolerance is quite acceptable since it is inappropriate for a pilot to "push the envelope" as far as permitted operating limitations of the aircraft may be concerned, and also because at least the processes of takeoff and landing of a small aircraft are carried out generally under visual conditions.

In any event, it will be seen that by the lookup and comparator means 30, 32 being appropriately instructed to find a calculated value of pressure density in the read only memory 24, that value of pressure density is then determined to be the pressure density at that instant in time, as determined from the instantaneous values of air temperature and air pressure as sensed by the sensors 12 and 14. An appropriate value is then displayed on the display means 28 at that instant in time.

Of course, it is understood that the operation of the microprocessor computer 20 may be such that it will continuously update the pressure density, sampling at a rate of perhaps every 10 seconds or 30 seconds, or when instructed to by the pilot of the aircraft.

As noted, in general, the calculating means 16 is found within the microprocessor computer 20.

Further input means are provided for inputting a selected parameter at any instant in time into the microprocessor computer 20. Those input means may be a keypad 40, or scroll keys 42.

In any event, a selected parameter may be chosen from the group consisting of the present standing altitude—the altitude of the runway where the aircraft is standing prior to takeoff—the aircraft weight, and in some instances the indicated air speed.

The intent is to provide to the microprocessor computer 20 a value of one of those parameters in order that a further readout may be determined for such aircraft performance characteristics as takeoff distance (ground roll required to takeoff), landing distance (ground roll required to stop the aircraft once it touches down), rate of climb, time to climb, fuel to climb, and distance to climb. Those various aircraft performance characteristics are discussed hereafter.

When the input means is a keypad 40, then numerical data can be input to the random access memory 22. Otherwise, the read only memory 24 may also include a parameter value table—usually, a table for each of the parameters of standing altitude, aircraft weight, and indicated airspeed. In that case, the scroll keys are used to select a specific selected parameter from the respective lookup table; and, once again, that specific value of the selected parameter will be input to the random access memory 22 of the microprocessor computer 20.

Typical aircraft performance characteristic lookup table values are given below. In each case, these aircraft performance characteristic lookup tables are taken from a Pilot Operating Handbook for a Cessna Model No. 172P aircraft, and it is assumed that the aircraft will have a weight of 2,400 pounds. Other operating conditions are noted, as appropriate, below. Of course, it is understood that the data shown in the tables below are characteristic only, and have been selected from much more data included in the tables found in the Pilot Operating Handbook. The data are chosen simply for purposes of illustration, so as to show the importance to the pilot of the aircraft of knowing the pressure density for the ambient in which the aircraft is operating at any instant in time.

TABLE 1

REQUIRED GROUND ROLL FOR TAKEOFF
Conditions: Flaps are set at 10°, there is full throttle prior to brake release, the runway is paved and level, there is zero wind, the takeoff speed will bxe 51 knots, and the aircraft weight is 2,400 pounds.

| Pressure Density (Feet) | 0° C Ground Roll (Feet) | 10° C. Ground Roll (Feet) | 30° C. Ground Roll (Feet) |
|---|---|---|---|
| Sea Level | 795 | 860 | 995 |
| 1000 | 875 | 940 | 1090 |
| 3000 | 1055 | 1140 | 1325 |
| 5000 | 1285 | 1390 | 620 |
| 7000 | 1580 | 1710 | 1800 |

A table for required ground roll for landing—a landing—distance table—may essentially be identical to Table I, noted above; often, the table may add an additional 10% to 15% ground roll length to that shown in the takeoff distance table, noted above.

TABLE II

MAXIMUM RATE OF CLIMB
Conditions: The conditions for this table are that the aircraft weight is 2,400 pounds, the flaps are up, and that the aircraft is operating at full throttle; it is assumed that the mixture will be leaned above 3,000 feet for maximum RPM.

| Pressure Density | Climb Speed | Rate of Climb (Feet per Minute) | | |
|---|---|---|---|---|
| (Feet) | (Knots) | −20° C. | 0° C. | 40° C. |
| Sea Level | 76 | 805 | 745 | 625 |
| 2000 | 75 | 695 | 640 | 525 |
| 6000 | 73 | 485 | 435 | 320 |
| 8000 | 72 | 380 | 330 | 220 |

The following table combines time to climb, fuel to climb, and distance to climb, in the that they are combined in the Pilot's Operating Handbook.

TABLE III

TIME, FUEL & DISTANCE TO CLIMB
Conditions: The aircraft weight is 2,400 pounds, the aircraft is operating with flaps up, and at full throttle.

| Pressure Density (Feet) | Climb Speed (Knots) | Rate of Climb (FPM) | Time (Minutes) | Fuel (Gallons) | Distance (Nautical Miles) |
|---|---|---|---|---|---|
| 1000 | 76 | 655 | 1 | 0.3 | 2 |
| 2000 | 75 | 610 | 3 | 0.6 | 4 |
| 6000 | 73 | 425 | 11 | 2.2 | 14 |
| 8000 | 72 | 330 | 7 | 3.1 | 22 |

At any instant in time, the present value of pressure density may be determined and fed to the microprocessor computer 20. At that same instant in time, a selected parameter of present standing altitude, aircraft weight, and indicated air speed may be chosen. Both the value of pressure density and the selected parameter may then be read by the lookup and comparator means 30, 32, and a specific correlated value may then be determined from a chosen one of the aircraft performance characteristic lookup tables stored in the read only memory 24. That specific correlated value of the chosen one of the aircraft performance characteristics is then fed to the output signal driver 26, so as to output a signal indicative of the correlated value of the chosen aircraft performance characteristic to the display means 28. Thus, the reading shown on the display means 28 will show a reading which is in real time, and which is indicative of the chosen aircraft performance characteristic for the pressure density conditions at that instant in time.

Thus, if the pressure density is shown to the pilot to be 3,000 feet and the pilot knows that the temperature in which he is operating is 110° C., then the pilot will know that he must have a runway of least 1,140 feet in order for the aircraft to takeoff—assuming the operating conditions for the aircraft otherwise to be as stated above.

Having taken off, and assuming a pressure density of 6,000 feet with a climb speed of 73 knots, the pilot will know that, if the temperature outside the aircraft has fallen to 0° C., the rate of climb for the aircraft will be 435 feet per minute.

Similarly, from Table III, it is possible for the pilot to determine the time to climb to a specific pressure density altitude, the fuel required to get there, and the distance in nautical miles that the aircraft will have to travel to get there.

In order to calculate true air speed, the pilot will enter indicated air speed into the microprocessor computer 20 using the keypad 40 or scroll keys 42, and a determination of pressure density will be made as described above. Then, lookup tables may further be referred to by the lookup and comparator means 30, 32, to determine the true air speed for the aircraft. Here, a co-relation is made from the indicated air speed to a calculated air speed based on the present conditions of pressure density, from which the true air speed may be determined by the use of appropriate lookup tables in much the same manner as described above.

It has been noted that the aircraft performance characteristic lookup tables may be specific to either a particular aircraft type, or they may be specific to a chosen group of particular aircraft types.

Moreover, the apparatus of the present invention may be portable, in that it is self-powered and self-contained, so that it may be moved from one aircraft to another. This is particularly useful for pilots who will rent an aircraft, for student pilots, and the like.

On the other hand, apparatus according to the present invention may be provided as an Original Equipment fitting for the aircraft. Typically, the apparatus is mounted in the windshield or a side window of the aircraft, with the display mounted in any convenient and appropriate location.

It will be understood that it is appropriate for the lookup tables from which the calculated values of pressure density are determined to be provided in the read only memory not only in a fairly wide range of both barometric pressure and air temperature, but in steps within that range. Thus, typically, the steps for barometric pressure over the designated range within the lookup table may be 0.2 inches of mercury for each step. However, different steps of 0.1 or perhaps 0.3 up to 0.5 inches of mercury may be chosen in some circumstances.

Likewise, temperature values are typically chosen in steps of ±5° F., although steps of 10° F. may also be chosen for calculation of the lookup tables installed in the read only memory.

There has been described above an apparatus for use in an aircraft for determining and displaying readings which are either indicative of pressure density at any instant in time, or which are dependent on the instantaneous value of pressure density. The physical appearance of the apparatus may vary depending on the type of aircraft in which it is to be used and, indeed, whether or not the apparatus is intended to be a hand-held or portable device or one which is permanently installed in an aircraft. Typical examples of the kind of information that an aircraft pilot will employ or require have been given; and it has been noted that pressure density or density altitude is, essentially, a fictitious value by which temperature corrected barometric pressure readings can be adjusted or manipulated so as to provide an indication of altitude above sea level, where the standard of zero is established for sea level at 59° F. and 29.92 inches of mercury.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. An apparatus for use in an aircraft for determining and displaying a reading on a display, which reading is indicative of pressure density at any instant in time, wherein said apparatus comprises:

sensing means for determining ambient air pressure of the location where an aircraft is situated at any instant in time, and outputting an electrical signal having a value which varies in accordance with the ambient air pressure of the location where the aircraft is located, at any instant in time;

sensing means for determining ambient air temperature of the location where an aircraft is situated at any instant in time, and outputting an electrical signal having a value which varies in accordance with the ambient air temperature of the location where the aircraft is located, at any instant in time;

calculating means for combining the electrical signals from said sensing means for ambient air pressure and ambient air temperature, and outputting a weighted signal for pressure density having a value based on an index value of zero for a pressure density at sea level when the ambient temperature is 59° F. and the ambient pressure is 29.92 inches of mercury;

microprocessor computer means having both random access memory and read only memory, and having output signal driver means for outputting a signal indicative of pressure density at any instant in time; and a display means for displaying a value of pressure density in respect of the location of an aircraft at any instant in time, based on the value of the signal received from said output signal driver means;

wherein said microprocessor computer means includes a lookup and comparator means, and said read only memory contains a plurality of calculated values of pressure density over a range of barometric pressure values chosen from the limits of from 28.5 inches of mercury to 31.5 inches of mercury, and a range of temperature values chosen from the limits of from −40° F. to +130° F.;

whereby the weighted signal from said calculating means may be read by said lookup and comparator means, and compared with values of pressure density stored in said read only memory, so as to determine the value of pressure density at that instant in time as represented by said weighted signal; and wherein the determined value of pressure density at that instant in time is fed to said output signal driver means so as cause said display means to display said determined value of pressure density in respect of the location of the aircraft at that instant in time.

2. The apparatus of claim 1, wherein said calculating means is included in said microprocessor computer means.

3. The apparatus of claim 2, further comprising input means for inputting a selected parameter at any instant in time to said microprocessor computer means, where said selected parameter is chosen from the group consisting of present standing altitude, aircraft weight, and indicated air speed.

4. The apparatus of claim 3, where said input means comprises a numeric keyboard.

5. The apparatus of claim 1, wherein said apparatus is portable, is self-powered and self-contained, and is adapted to be moved from one aircraft to another.

6. The apparatus of claim 1, wherein said apparatus is adapted to be permanently mounted in an aircraft.

7. The apparatus of claim 1, wherein said calculated values of pressure density over a range of barometric pressure values and a range of temperature values provide data over a range of barometric pressure values chosen from the limits of 28.5 inches of mercury to 31.5 inches of mercury, in steps of 0.2 inches of mercury; and wherein said data are provided over a range of temperature values chosen from the limits of −40° F. to +130° F., in steps of ±5° F.

8. An apparatus for use in an aircraft for determining and displaying a reading on a display, which reading is indicative of pressure density at any instant in time, wherein said apparatus comprises:

sensing means for determining ambient air pressure and outputting an electrical signal having a value which varies in accordance with the ambient air pressure at any instant in time;

sensing means for determining ambient air temperature and outputting an electrical signal having a value which varies in accordance with the ambient air temperature at any instant in time;

microprocessor computer means having both random access memory and read only memory, and having output signal driver means for outputting a signal indicative of pressure density at any instant in time;

calculating means included in said microprocessor computer means, for combining the electrical signals from said sensing means for ambient air pressure and ambient air temperature, and outputting a weighted signal for pressure density having a value based on an index value of zero for a pressure density at sea level when the ambient temperature is 59° F. and the ambient pressure is 29.92 inches of mercury;

a display means for displaying a value of pressure density at any instant in time, based on the value of the signal received from said output signal driver means; and input means for inputting a selected parameter at any instant in time to said microprocessor computer means, where said selected parameter is chosen from the group consisting of present standing altitude, aircraft weight, and indicated air speed;

wherein said microprocessor computer means includes a lookup and comparator means, and said read only memory contains a plurality of calculated values of pressure density over a range of barometric pressure values chosen from the limits of from 28.5 inches of mercury to 31.5 inches of mercury, and a range of temperature values chosen from the limits of from −40° F. to +130° F.;

wherein said input means comprises at least a selector key and a scroll key;

wherein said read only memory further includes at least one parameter value table chosen from the group of parameters consisting of present standing altitude, aircraft weight, and indicated air speed;

whereby said selector key and scroll key is used to select a specific selected parameter and a specific value for the selected parameter, and whereby said specific value of said selected parameter is input to said microprocessor; and whereby the weighted signal from said calculating means may be read by said lookup and comparator means, and compared with values of pressure density stored in said read only memory, so as to determine the value of pressure density at that instant in time as represented by said weighted signal;

wherein said read only memory includes at least one aircraft performance characteristic lookup table chosen from the group of aircraft performance characteristic lookup tables consisting of takeoff distance, landing distance, rate of climb, time to climb, fuel to climb, and distance to climb; and wherein the determined value of pressure density at that instant in time is fed to said output signal driver means so as cause said display means to display said determined value of pressure density at that instant time.

9. The apparatus of claim 8, wherein, at any instant in time, the present value of pressure density is determined and fed to said microprocessor, a selected parameter is input to said microprocessor, and the values of pressure density and said selected parameter are read by lookup means and comparator means so as to determine a specific correlated value from a chosen one of said aircraft performance characteristic lookup tables; and wherein said specific correlated value of the chosen one of said aircraft performance characteristics is fed to said output signal driver so as to output a signal indicative thereof to said display means;

whereby, said display means will show a reading of the chosen aircraft performance characteristic for the pressure density conditions at that instant in time.

10. The apparatus of claim 9, wherein said aircraft performance characteristic lookup tables are specific to a particular aircraft type.

11. The apparatus of claim 9, wherein there are aircraft performance characteristic lookup tables included in said read only memory that are specific to a chosen group of particular aircraft types.

12. An apparatus for use in an aircraft for determining and displaying a reading on a display, which reading is indicative of pressure density at any instant in time, wherein said apparatus comprises:

sensing means for determining ambient air pressure and outputting an electrical signal having a value which varies in accordance with the ambient air pressure at any instant in time;

sensing means for determining ambient air temperature and outputting an electrical signal having a value which varies in accordance with the ambient air temperature at any instant in time;

microprocessor computer means having both random access memory and read only memory, and having output signal driver means for outputting a signal indicative of pressure density at any instant in time;

calculating means included in said microprocessor computer means, for combining the electrical signals from said sensing means for ambient air pressure and ambient air temperature, and outputting a weighted signal for pressure density having a value based on an index value of zero for a pressure density at sea level when the ambient temperature is 59° F. and the ambient pressure is 29.92 inches of mercury;

a display means for displaying a value of pressure density at any instant in time, based on the value of the signal received from said output signal driver means; and input means comprising a numeric keyboard for inputting a selected parameter at any instant in time to said microprocessor computer means, where said selected parameter is chosen from the group consisting of present standing altitude, aircraft weight, and indicated air speed;

wherein said microprocessor computer means includes a lookup and comparator means, and said read only memory contains a plurality of calculated values of pressure density over a range of barometric pressure values chosen from the limits of from 28.5 inches of mercury to 31.5 inches of mercury, and a range of temperature values chosen from the limits of from −40° F. to +130° F.;

wherein said read only memory includes at least an aircraft performance characteristic lookup table chosen from the group of aircraft performance characteristic lookup tables consisting of takeoff distance, landing distance, rate of climb, time to climb, fuel to climb, and distance to climb;

wherein, at any instant in time, the present value of pressure density is determined and fed to said microprocessor, a selected parameter is input to said microprocessor, and the values of pressure density and said selected parameter are read by lookup means and comparator means so as to determine a specific correlated value from a chosen one of said aircraft performance characteristic lookup tables; and wherein said specific correlated value of the chosen one of said aircraft performance characteristics is fed to said output signal driver so as to output a signal indicative thereof to said display means;

whereby the weighted signal from said calculating means may be read by said lookup and comparator means, and compared with values of pressure density stored in said read only memory, so as to determine the value of pressure density at that instant in time as represented by said weighted signal;

wherein the determined value of pressure density at that instant in time is fed to said output signal driver means so as cause said display means to display said determined value of pressure density at that instant time and wherein said display means shows a reading of the chosen aircraft performance characteristic for the pressure density conditions at that instant in time.

13. The apparatus of claim 12, wherein said aircraft performance characteristic lookup tables are specific to a particular aircraft type.

14. The apparatus of claim 12, wherein there are aircraft performance characteristic lookup tables included in said read only memory that are specific to a chosen group of particular aircraft types.

\* \* \* \* \*